(12) United States Patent
Walker et al.

(10) Patent No.: US 9,002,017 B2
(45) Date of Patent: Apr. 7, 2015

(54) METHOD AND APPARATUS FOR KEY DISTRIBUTION FOR SECURE DIGITAL CINEMA PRESENTATIONS

(75) Inventors: Mark Leroy Walker, Castaic, CA (US); Suqing Li, Valencia, CA (US); William Gibbens Redmann, Glendale, CA (US)

(73) Assignee: Thomson Licensing, Boulogne-Billancourt (FR)

(*) Notice: Subject to any disclaimer, the term of this patent is extended or adjusted under 35 U.S.C. 154(b) by 1025 days.

(21) Appl. No.: 12/085,488

(22) PCT Filed: Sep. 7, 2006

(86) PCT No.: PCT/US2006/034515
§ 371 (c)(1),
(2), (4) Date: May 23, 2008

(87) PCT Pub. No.: WO2007/067235
PCT Pub. Date: Jun. 14, 2007

(65) Prior Publication Data
US 2009/0196426 A1   Aug. 6, 2009

Related U.S. Application Data (60) Provisional application No. 60/742,478, filed on Dec. 5, 2005.

(51) Int. Cl.
| | |
|---|---|
| H04L 9/08 | (2006.01) |
| H04L 29/06 | (2006.01) |
| H04L 9/32 | (2006.01) |
| H04N 7/167 | (2011.01) |
| H04N 7/173 | (2011.01) |
| H04N 21/266 | (2011.01) |
| H04N 21/414 | (2011.01) |

(Continued)

(52) U.S. Cl.
CPC ......... *H04N 7/1675* (2013.01); *H04N 7/17309* (2013.01); *H04L 63/06* (2013.01); *H04L 9/08* (2013.01); *H04N 21/26606* (2013.01); *H04N 21/41415* (2013.01); *H04N 21/63345* (2013.01); *H04N 21/6581* (2013.01)

(58) Field of Classification Search
None
See application file for complete search history.

(56) References Cited

U.S. PATENT DOCUMENTS

| | | | |
|---|---|---|---|
| 5,625,692 A * | 4/1997 | Herzberg et al. | 380/286 |
| 7,016,878 B2 | 3/2006 | Yoshioka et al. | |

(Continued)

FOREIGN PATENT DOCUMENTS

| | | |
|---|---|---|
| EP | 1271951 | 1/2003 |
| JP | 991344 | 4/1997 |

(Continued)

OTHER PUBLICATIONS

International Search Report, dated Feb. 21, 2007.

(Continued)

*Primary Examiner* — Fatoumata Traore
(74) *Attorney, Agent, or Firm* — Robert D. Shedd; Robert B. Levy (57) ABSTRACT

Key distribution within a digital cinema presentation facility (140) occurs according to a retrieval process (200, 300) that provides for automatic retrieval at a scheduled time. The process further includes redundant mechanisms to transfer the necessary keys, in different ways to enable theater personnel to obtain the required key in a variety of different ways.

20 Claims, 4 Drawing Sheets

(51) Int. Cl.
*H04N 21/6334* (2011.01)
*H04N 21/658* (2011.01)

(56) References Cited

U.S. PATENT DOCUMENTS

| | | | |
|---|---|---|---|
| 7,203,319 B2 * | 4/2007 | Ben-Zur et al. | 380/283 |
| 7,222,236 B1 * | 5/2007 | Pagel | 713/176 |
| 7,263,188 B2 * | 8/2007 | Kohno | 380/231 |
| 7,343,487 B2 * | 3/2008 | Lindqvist et al. | 713/162 |
| 2002/0056081 A1 * | 5/2002 | Morley et al. | 725/1 |
| 2002/0122051 A1 * | 9/2002 | Hose et al. | 345/716 |
| 2003/0007643 A1 | 1/2003 | Ben-Zur et al. | |
| 2003/0016825 A1 * | 1/2003 | Jones | 380/210 |
| 2003/0068046 A1 | 4/2003 | Lindqvist et al. | |
| 2003/0198347 A1 | 10/2003 | Ribes et al. | |
| 2003/0202661 A1 | 10/2003 | Rodriguez et al. | |
| 2004/0109137 A1 | 6/2004 | Bubie et al. | |
| 2005/0071272 A1 | 3/2005 | Yoshioka et al. | |
| 2009/0196426 A1 | 8/2009 | Walker et al. | |

FOREIGN PATENT DOCUMENTS

| | | |
|---|---|---|
| JP | 1127647 | 1/1999 |
| JP | 2002515701 | 5/2002 |
| JP | 2003174439 | 6/2003 |
| JP | 2004222245 | 8/2004 |
| JP | 2004236136 | 8/2004 |
| JP | 2009518949 | 5/2009 |
| WO | WO2005101837 | 10/2005 |

OTHER PUBLICATIONS

Digital Cinema Initiatives, LLC, "Digital Cinema Initiatives". V 1.0, Jul. 20, 2005: pp. 146-153.

* cited by examiner

METHOD AND APPARATUS FOR KEY DISTRIBUTION FOR SECURE DIGITAL CINEMA PRESENTATIONS

CROSS-REFERENCE TO RELATED APPLICATIONS

This application claims the benefit, under 35 U.S.C. §365 of International Application PCT/US2006/034515, filed Sep. 7, 2006, which was published in accordance with PCT Article 21(2) on Jun. 14, 2007, in English and which claims the benefit of U.S. provisional patent application No. 60/742,478, filed Dec. 5, 2005.

FIELD OF THE INVENTION

The present invention relates to digital cinema, and more specifically to the timely, reliable distribution of keys for digital cinema presentations.

BACKGROUND OF THE INVENTION

The term "Digital Cinema" generally refers to the theatrical presentation of motion pictures (as well as other types of audio-visual works) by electronic means, such as the use of projectors that receive digital data and render that data into optical stream for projection on a screen. To facilitate the coordination among content creators, content distributors, equipment providers and theaters, seven motion picture studios: Disney, Fox, Metro-Goldwyn-Mayer, Paramount Pictures, Sony Pictures Entertainment, Universal Studios, and Warner Bros. Studios, created an entity known as Digital Cinema Initiatives, LLC (DCI), which published the *Digital Cinema System Specification V*1.0, (DCI Specification) on Jul. 20, 2005. The primary purpose of DCI was to establish uniform specifications that would ultimately permit full realization of the benefits of digital cinema to theater audiences, theater owners, filmmakers and distributors.

The DCI specification describes the formatting of files representing moving images, audio and other data for distribution to theatres. In the theatre, such files provide a non-fading, non-scratched version of an audio visual presentation that affords the same high quality presentation to viewers each and every time so the presentation looks as good at its last showing as it did during its initial showing. The very advantage of digital cinema makes it very attractive to media pirates. Thus, a danger exists that media pirates will attempt to acquire a copy of the pristine digital files in order to make and sell counterfeit DVDs of high quality and do so ahead of the studio's intended release schedule.

The DCI Specification details a mechanism to secure digital cinema presentations continuously, until the very moment the presentation appears on the theatre screen. Collectively, the files representing a presentation comprise a "package". Each file of the package is encrypted with a different symmetric key at the time of packing. Those same keys become necessary to decrypt the corresponding files when played for presentation.

Each theater will receive the same package containing the encrypted media files. However, while every package remains the same, each theater receives a different key for each screen. Rather than distribute these keys in an unsecured way, the keys themselves undergo encryption. Further, for each screen there exists a different encryption. Each screen (i.e., each individual auditorium) typically has its own Screen management System (SMS) which includes the secure media block (i.e., media decoder) and an associated projector, constituting all the equipment needed to show a presentation. As a result of the different encryption used for each screen, the key for the target SMS will have no use on another SMS. In other words, each SMS will require its own key. A theater having multiple screens will typically have a theater management system (TMS) for controlling each individual SMS.

In practice, the encryption specified for keys makes use of an asymmetric public key technique. Each target SMS showing DCI compliant presentations will have a secure digital certificate. The target SMS associated with this secure digital certificate has a corresponding private key for decrypting. The distributor will provide the certificate which represents the public key corresponding to the private key known only by the target. In this way, the distributor can prepare and encrypt the package, and distribute it to all theatres, such as by satellite broadcast. The contents have no use to anyone without the keys for decryption.

A distributor will assemble and encrypt the keys for decryption of the package using the certificate provided, thus creating a "Key Distribution Message" (KDM) which comprises an encrypted collection of keys only readable by the target SMS whose certificate was used. When prepared in this way, the KDMs are unique for each theater screen authorized to exhibit the presentation. Typically, the KDMs have a relatively small size (e.g., several kilobytes).

The DCI Specification does not provide many details for distribution of the KDMs. However, the DCI specification does require a dial-up modem connection as the means for transporting KDMs. The specification allows for the provision of alternative interfaces.

The DCI Specification further encourages that the TMS or SMS, following receipt (i.e., ingest) of a complete package at theater, verify the availability of a KDM and display the corresponding time window for showing the content. A show schedule generated by the TMS or SMS can reveal conflicts between the KDM and the scheduled showings. In addition, the DCI Specification encourages that the TMS or SMS alert the projectionist or theatre management when a KDM will expire within 48 hours of the current time.

Present-day, experimental implementations of digital cinema typically find KDMs placed on a removable FLASH storage device having a USB interface. These small, highly portable storage devices can be physically mailed or personally transported to the target system. Once brought to the target system and installed, a projectionist uses a control interface on the target SMS to navigate to the FLASH drive. Then the projectionist manually browses through the directory structure, and selects an appropriate KDM, and commands the target system to load the KDM.

In certain circumstances, e.g. a premiere, where a specific presentation is restricted to a particular screen, then only a single KDM is necessary. However, unnecessary constraints tying a presentation to a specific screen should generally prove undesirable. If a theater has four digital cinema screens and books three movies, the distributor will preferably provide separate KDM for each of the twelve possible combinations. The result proliferation of KDMs makes manual key management difficult.

The combination of present-day digital cinema implementations and the behaviors specified or recommended by the DCI Spec given rise to need to manage a large amount of information theater by the operator, thus giving rise to numerous opportunities to fail to find or timely retrieve a KDM. Additionally, the simple inconvenience generated by the introduction of security keys creates an artifact not presently found in film projection systems, and can ultimately result in the inability to show a presentation at a desired time. There exists a need to overcome this shortfall.

SUMMARY OF THE INVENTION

Briefly, in accordance with a preferred embodiment of the present principles, there is provided a method for key distribution in a digital cinema presentation facility, that is a digital cinema theater, having a plurality of screens. The method commences by receiving within the presentation facility at least one key distribution message for decrypting a given digital cinema presentation (e.g., a movie). A determination is then made whether the given digital cinema presentation to be decrypted by that key distribution method has a presentation time within a validity interval associated with the key distribution message, If so, the key distribution message is routed within the presentation facility to enable showing of the digital cinema presentation at a preselected screen.

DETAILED DESCRIPTION

The present invention provides an effective way to distribute a KDM generated for a corresponding presentation system in a theater.

Figure 1:
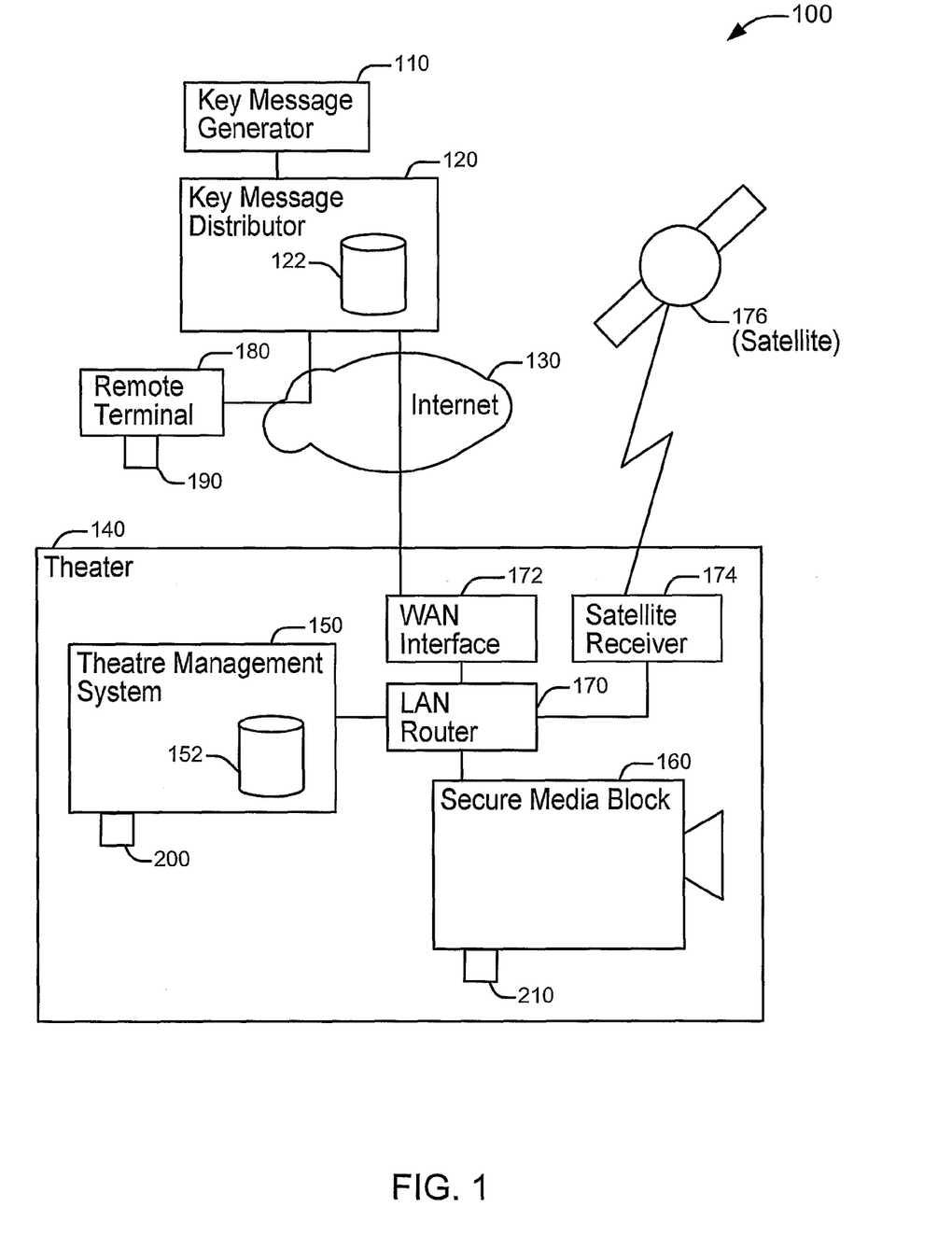
FIG. 1 depicts is a block diagram of a digital cinema system showing components for distribution of the Key Distribution Message (KDM)

FIG. 1 shows a Key Distribution Message (KDM) distribution system 100 which accepts a KDM from a key message generator 110. The KDM distribution system 100 comprises key message distributor 120 that includes a storage device 122, for distributing one or more KDMs via the Internet 130 to a digital cinema presentation facility, depicted in FIG. 1 as theater 140. In the event of the inability of the key distribution manager 120 to supply a KDM, a remote terminal 180, connected to the Internet 130, could serve as a back-up. As discussed hereinafter, the remote terminal 180 include an associated storage device 190 for storing a back-up KDM.

Distribution of a KDM could occur using a satellite 176 for downlink to a satellite receiver 174 within theater 140. (A corresponding uplink would exist from the key message distributor 120 to the satellite 176 but does not appear in FIG. 1.) Satellite distribution of KDM remains less preferred as compared to distribution over the Internet 130.

Within theater 140 there exists at least one the secure media block 160. For purposes of the secure media block 160 comprises at least a digital cinema projector and associated mechanisms for both decrypting and at least temporarily storing a digital cinema presentation. Such mechanisms for encrypting and storing the digital cinema presentation could exist within the projector itself or as separate elements. Stated another way, the secure media block 160 comprises components within a digital cinema system that serves to decrypt, store and present a digital cinema presentation on a specific screen within theater 140. Thus, in a multi-screen theater, multiple secure media blocks 160 will exist, one for each screen The various descriptions of the secure media block 160 are not intended to be specifically limiting, except insofar as certain functions related to security issues that are required to occur in specific portions of specific pieces of equipment. No description within this disclosure should be construed to contradict a requirement of the DCI Specification document.

In accordance with the DCI specification, the secure media block 160 has a uniquely associated digital certificate provided by a certificate authority, a well known process. To create a KDM specific to the secure media block 160 for a particular presentation (a 'composition' in the DCI Spec), the key message generator 110 requires a copy of the certificate for the secure media block 160, and uses that certificate to encrypt a set of keys and to further collect those encrypted keys.

As discussed above, the key message distributor 120 receives a KDM from the key message generator 110 for storage on a storage device 122. In accordance with the DCI specification, the KDM itself specifies its association with the corresponding secure media block 160. Details of this association can appear in a database (not shown), or in a portion of the KDM filename, or can appear in the nature of the directory structure of storage 122 device storing the KDM. High performance system could choose to store the KDM and its association in a secure database (not shown). In contrast, low-overhead system can elect to store the KDM corresponding to the secure media block 160 in a directory associated with that secure block. Such a directory would constitute a subdirectory of a directory associated with theater 140.

Preferably, appropriate systems can access a KDM held by Key Message Distributor 120 through one or more interfaces. In a preferred order suggested by efficiency and convenience, the present principles prescribe that a sequence of systems seek to access the KDM and provide it to the secure media block 160. There exists an expectation that subsequent success by systems later in the preferred will overcome any lack of success by systems earlier in the preferred order. This escalation provides high reliability in the face of multiple equipment and procedural failures.

As indicated, theater 140 includes at least one media secure block 160. For the purposes of this discussion, the secure media block 160 presumably incorporates the functionality of a screen management system, as discussed by the DCI Specification. In the event of multiple screens, and hence, multiple secure media blocks 160, the theater 140 could possess a theater management system 150, for managing each the secure media block 160. Within theater 140, a local area network (LAN) interconnects the theater management system 150 to each the secure media block 160 through LAN router 170. These devices have access to a wide area network (WAN), e.g., the Internet 130, through a WAN interface 172. The WAN interface 172 could comprise a dial-up modem configured to call an Internet service provider. Preferably, the WAN interface 172 provides a higher bandwidth connection, such as a DSL modem, or cable modem. If the WAN interface 172 possesses multiple modes of WAN connectivity, the interface could give priority to the faster connection, or the connection considered most secure.

In practice, the theater 140 receives encrypted content (e.g., one or more digital cinema presentations) at a satellite receiver 174 via a downlink from a satellite 176. While the secure media block 160 could receive the encrypted content directly from the satellite receiver 174, preferably, the theater management system 150, or a separate ingest server (not shown), receives the encrypted content for accumulation and distribution via the LAN router 170. To that end, the theater management system 150 includes a storage device 152, such as a disc drive or array of disk drives, for storing content subsequently directed to the appropriate secure media block 160. Alternatively, the secure media block 160 could retrieve the encrypted content from the theater management system 150. Until such time as the secure media block 160 possess both the encrypted content and a KDM corresponding to that encrypted content and to the secure media block itself, the encrypted content will remain inaccessible. If the secure media block 160 fails to receive the KDM timely fashion, the secure media block will fail to show the presentation.

Distribution of the KDM and the encrypted content can occur in any order. In other words, distribution of the KDM can precede distribution of the encrypted content or vice versa. Preferably, the theater management system 150 will attempt to gather the KDM(s) from the key message distributor 120 appropriate for the secure media block(s) 160 within the theater 140. In the illustrated embodiment, the storage device 122 within the key message distributor possesses a directory arrangement for storing a KDM for a given the secure media block 160 in a given theater 140 in a subdirectory specifically allocated to that the secure media block. The secure media block subdirectory resides as a subdirectory specifically allocated to theater 140.

To obtain the required KDM(s) for its theater 140, the theater management system 150 would initiate a File Transfer Protocol (FTP) connection to the key message distributor 120 through the LAN router 170, the WAN interface 172, and the Internet 130. Preferably, the theater management system 150 will conduct the FTP session in a secure manner under a username associated with the theater 140. The home directory for the username associated with theater 140 will correspond to the subdirectory associated with that theater. In this way, the theater management system 150 can gain access to a subdirectory containing a subdirectory for each the secure media block 160, which in turn, contains the corresponding KDM(s) previously generated and supplied from key message generator 110. The storage device 152 of the theater management system 150 will copy each KDM so found via the FTP, taking care to avoid duplication or overwriting of any previously obtained distinct KDM as discussed below.

Preferably, the theater management system 150 automatically retrieves KDM(s) according to a regular schedule. For example, in the United States, the release of new movies tends to occur on Fridays. Thus, the theater management system 150 within a US theater could connect with the key message distributor 120 every Tuesday night to allow time for alternative processes to engage in the case that scheduled retrieval fails to obtain a needed KDM.

The retrieval of a KDM by the theater management system 150 can also occur manually. For instance, if the manager of theater 140 has a conversation with a human operator of key message distributor 120 indicating the desirability to obtain a KDM previously missing from storage 122 at the scheduled retrieval time, then a manually initiated retrieval sequence would successfully find the previously absent KDM. After obtaining the needed KDM, the theater management system 150 could send that KDM to the corresponding the secure media block 160. Alternatively, a message from the theater management system 150 indicating the availability of the KDM would trigger the secure media block 160 to retrieve the KDM from the storage device 152. Further, the secure media block 160 could automatically seek the KDM, for instance, if that secure media block has not yet obtained the KDM for a presentation scheduled to occur in the near future.

In the case of a failure of the theater management system 150, the secure media block 160, through its internal management system, could undertake to obtain the KDM directly from the key distributor 120. The secure media block 160 would make such a connection using the same theater-specific credentials. Following such a connection, subsequent file navigation would lead to the subdirectory associated with the secure media block 160 to enable access to each appropriate KDM.

In the event of a failure of the theater management system 150 to obtain and distribute the KDM, the secure media block 160 would connect to the key message distributor 120 automatically, and according to a schedule related to a need for the KDM (i.e., a pending scheduled presentation). In a more severe failure mode, the WAN interface 172 could undergo a sustained loss of service. In this case, neither the theater management system 150, nor the secure media block 160 could directly connect with the key message distributor 120. Under such circumstances, the theater management system 150 could generate a warning (e.g., "The key message distributor 120 has become inaccessible"). Alternatively, or in addition to that warning, the secure media block 160 could generate also generate a warning (e.g., "No KDM exists for a pending presentation"). The key message distributor 120 could also generate a warning (e.g., "A KDM for theater 140 has not been retrieved"). Such message(s) would appear to the manager of theater 140, the projectionist responsible for the secure media block and projector 160, and the operators of key message distributor 120, respectively.

In the event of a failure of the WAN interface 172, personnel responsible for theater 140 would make arrangements to obtain the KDM through the remote terminal 180 which could comprise a personal computer, or other such device capable of accessing the Internet 130, directly or indirectly, and for downing information therefrom. For example, the remote terminal 180 could comprise the home computer of the manager of theater 140. Under such circumstances, the key message distributor 120 could e-mail KDM through Internet 130 (via mail servers or the like, not shown) for retrieval through at the remote terminal 180. The e-mail from the key message distributor would include the KDM as a file attached to the email. Theater operator could then save the attached KDM file to a removable media 190. Preferably, removable media 190 comprises a FLASH memory device with a USB interface.

Alternatively, the key message distributor 120 could present a web interface. Using a web browser running on a remote terminal 180, the theater manger or other authorized personnel representing the theater 140 could log into the web interface, provide username and password credentials, and obtain download access to the not-yet obtained KDM. The downloaded KDM would be saved on the removable media 190. While the remote terminal 180 could comprise a proprietary machine and/or make use of a proprietary application to obtain a KDM, preferably, the remote terminal 180 can take the form of any readily available typically configured, Internet-ready computer. In a panic situation, such as the imminent threat of a presentation failing to occur, the theater manager could run down to a neighborhood Internet café to obtain the vital, missing KDM.

In the final leg of redundant KDM distribution paths, if the personnel responsible for the theater 140 still have had no success in retrieving the KDM, the operator of the key message distributor 120 can manually collect a KDM needed by theater 140, place that KDM on the removable media as 190, and arrange for shipping of that removable media to the theater 140 for loading in time for the corresponding presentation. The theater management system 150 would access such removable media at an interface 200, which could comprise a USB port in the event that the removable media comprises a FLASH memory. Should the removable media comprise a magnetic or magneto-optical storage device; the interface 200 would comprise a reader capable of reading such a storage device. In this way, the theater management system 150 can detect the presence of removable media and automatically note that a KDM is present. Alternatively, an operator can manually trigger the theater management system 150 to look for a KDM. In any event, the KDM, when received, undergoes storage in the storage 152 device and subsequent distribution to the corresponding the secure media block 160 as previously described. To assure further redundancy, the secure media block 200 can also possess an interface 210, similar to the interface 200 associated with the theater management system 150, to enable searching for, and loading of a KDM, following an automatic or manual trigger.

In illustrated embodiment, the storage devices 122 and 152 will maintain analogous subdirectory hierarchies. Preferably, the removable media 190 replicates this hierarchy as well. In this way, the method of performing a search for a KDM corresponding to a specific the secure media block 160 remains significantly similar whether the theater management system 150 searches a removable media or the storage device 122; or whether the secure media block 160 searches a removable media, the theater management storage device 152, or the key distributor storage device 122.

Figure 2:
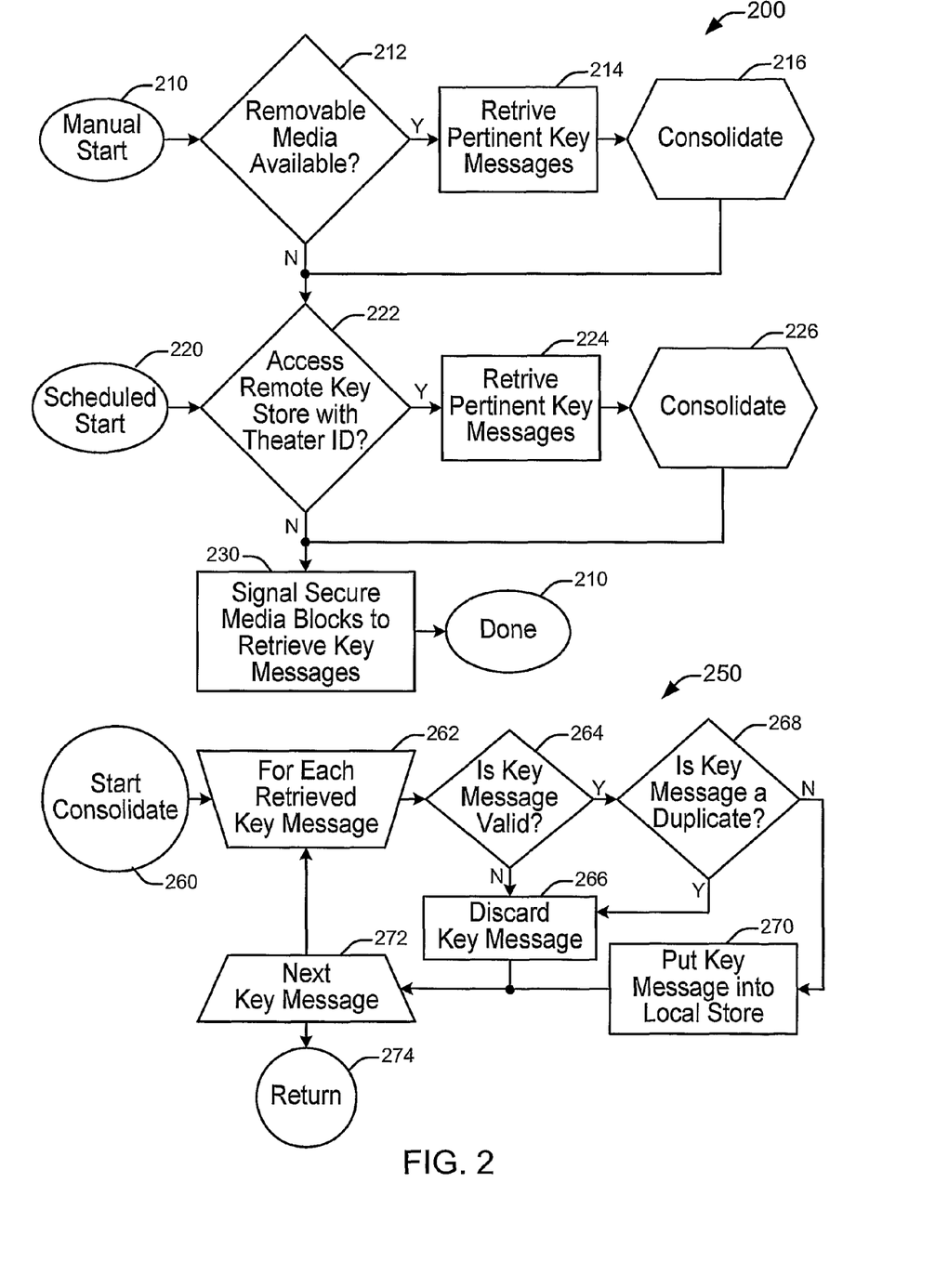
FIG. 2 depicts a flowchart showing the steps of a method for KDM distribution conducted by a the theater management system (TMS) within a digital cinema presentation system.

FIG. 2 depicts in flow chart form a process 200 for KDM retrieval performed by the theater management system 150 of FIG. 1. The method can commence with step 210 during which theater personnel manually trigger key retrieval. Typically, manual retrieval occurs after attaching a removable media (such as removable media 190) to the theater management system 150. Thereafter, step 212 occurs during which the theater management system 150 checks for the presence of any removable media. If the theater management system 150 of FIG. 1 finds a removable media and the media contains one or more KDMs, the process 200 continues at step 214. Upon detecting no removable media or that the removable media does not contain any pertinent KDMs, the retrieval process 200 continues at step 222.

During step 214, retrieval of each pertinent KDM occurs. Step 216 follows step 214 during which a consolidation process 250 occurs as subroutine described below. Step 222 follows step 212 in the absence of finding any retrievable media or that the media lacks a pertinent KDM. In ordinary operation, step 222 will follow step 220 which triggers the retrieval process 200 to run periodically (e.g., once per week). The scheduled trigger occurring during step 220 does not attempt to find or examine the removable media but rather leads to step 222. During step 222, the theater management system 150 attempts to connect via the WAN interface 172 and the Internet 130 of FIG. 1 to the key message distributor 120 of FIG. 1. Upon a successful connection, the retrieval process 200 continues at step 224, but if the connection fails, the retrieval process 200 continues at step 230.

During step 224, retrieval of each pertinent KDM available from the key message distributor 120 occurs. Subsequently, during step 226, execution of the consolidation process 250 occurs. If any KDM, either gathered following execution of the consolidation process 250 during either of steps 216 or 226 or gathered previously, remains not retrieved by the corresponding secure media block 160 of FIG. 1, then during step 230, signaling of the corresponding the secure media block to retrieve any corresponding KDM will occur. In an alternative embodiment of step 230, an undistributed KDM can be pushed to the corresponding the secure media block 160 of FIG. 1.

Consolidation process 250 constitutes a subroutine that examines each KDM encountered to determine whether to incorporate that KDM into the existing collection. The consolidation process 250 begins at start step 260 and thereafter enters a loop at step 262 to examine each retrieved KDM. Within that loop, each retrieved KDM first gets examined to ascertain its validity during step 264. If upon finding the retrieved KDM valid, then step 268 follows to determine whether the retrieved KDM duplicates a previously received KDM. The detection of an invalid KDM during step 264 results in producing at least a log entry noting receipt of an invalid KDM (not shown) followed by step 266 during which discard of the retrieved key message occurs. A duplicate KDM detected during step 268 doesn't require a log entry, but a duplicate KDM also undergoes discarding during step 266. A KDM found valid during step 264 and not duplicated during step 268 undergoes storage during step 270 before proceeding to step 272 to make a determination whether any additional KDM needs examination. If so, the process proceeds to step 262 as discussed above. If no additional KDMs exist for examination, the consolidation sub-routine 250 ends at step 274, returning to the routine which had called it.

As indicated above, under optimal circumstances, the key retrieval process 200 runs once per week, automatically, according to a schedule beginning at step 220, and successfully retrieves a KDM corresponding to each presentation for the theater 140 of FIG. 1 and each secure media block 160 for which the theater management system 150 is responsible. Thus, if the theater 140 has four the secure media blocks 160 (i.e., four digital cinema projectors), and theater 140 is scheduled to show three movies in the coming week, the theater management system 150 will download a KDM for each of the twelve possible movie & the secure media block combinations. Even though the proliferation of KDMs might make manual management difficult, the technique of the present principles largely removes the need for manual management, except in extreme circumstances.

Figure 3:
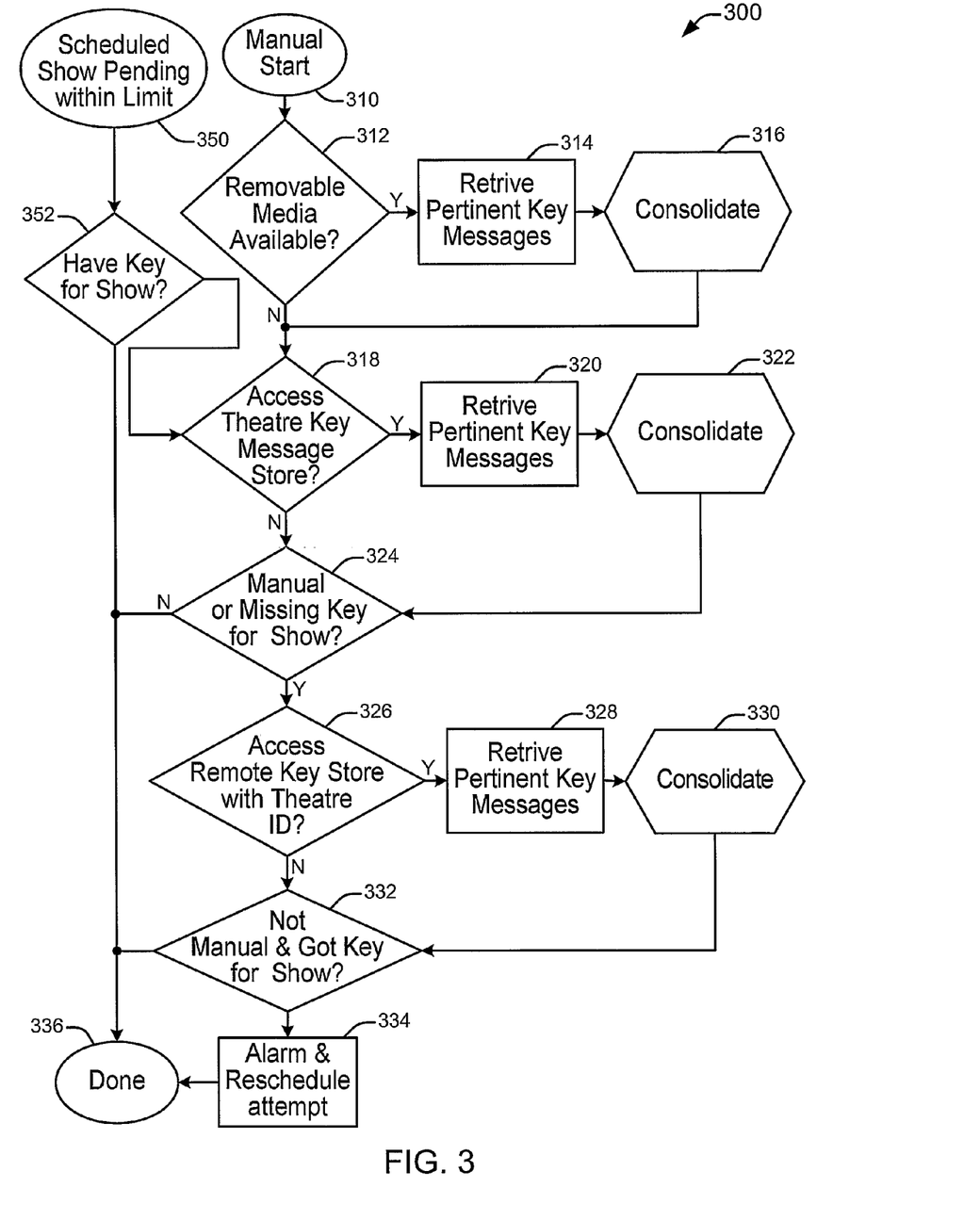
FIG. 3 depicts a flowchart showing the steps of a method for KDM distribution conducted by a Screen management System (SMS) and, FIG. 4 depicts a timeline illustrating significant events within the lifetime of a KDM in accordance with the present principles.

FIG. 3 depicts in flowchart form the steps of a key retrieval process 300 performed by the screen management system comprising part of the secure media block 160. The key retrieval process 300 has many similarities with the key retrieval process 200 of FIG. 2 but is taken from the perspective of an individual screen. Under optimal conditions, such as when a scheduled presentation becomes imminent (a measure of time discussed more fully with regard to FIG. 4), the time-to-presentation will fall within a predetermined window, initiating step 350. Alternatively, if a presentation is newly scheduled to a time within a predetermined limit, step 350 will occur immediately.

Step 352 follows step 350 during which a check occurs to determine the presence of each KDM needed for the scheduled presentation. In the absence of a KDM needed for the scheduled presentation, process execution branches to step 318. Otherwise, with every KDM needed for a scheduled presentation already at the secure media block 160, then the retrieval process 300 terminates at step 336.

As indicated, step 318 will commence when a need exists to retrieve at least one KDM. During step 318, access to the KDM store 152 within the theater management system 150 begins. Upon successful access, and the existence of the appropriate KDM within the storage device 152, then step 320 will commence. Otherwise, if the access has not been successful, or the storage device 152 does not contain the pertinent KDM, then the retrieval process 300 continues at step 324. During step 320, retrieval of each pertinent KDM will occur. Subsequently, the consolidation process 250 sub-routine undergoes execution when called during step 322.

Following step 322, or in the absence of finding a pertinent KDM during step 318, the retrieval process 300 continues at step 324.

During step 324, a check occurs as to whether the current execution of the process 300 resulted from automatic triggering during step 350, and whether every KDM necessary for the scheduled performance has already been obtained. If so, then the key retrieval process 300 proceeds to step 336, and terminates. This chain of events constitutes the normal course of operation. If the initiation of key retrieval process 300 occurred manually (discussed below), or in the absence of any KDM needed for a scheduled show, then the process branches to step 326.

In a failure mode, such as when the theater management system 150 of FIG. 1 has gone offline or the storage device 152 has become corrupted, the screen management system associated with the secure media block 160 will proceed to step 326 and attempt to connect with the key message distributor 120 directly. In the absence of a connection, or in the absence of an available KDM, process execution continues at step 332. Assuming a successful connection and the availability of at least one pertinent KDM, then KDM retrieval occurs during step 328 following by execution of step 330 which triggers execution of the consolidation sub-routine 250 of FIG. 2.

Following completion of step 330, process execution branches to step 332 during which a check occurs to determine if a KDM is absent for a pending show presentation. In the absence of the needed KDM, then an alarm is generated during step 334 to notify personnel in the theater 140 of FIG. 1, in particular, the theater manager, the booth manager, and the projectionist responsible for the screen associated with the secure media block 160 of FIG. 1, and preferably the operator(s) of the key message distributor 120 of FIG. 1. The alarm can take the form of one or more on-screen pop-up alerts, emails, Short Message Service (SMS) pages, outbound Interactive Voice Response (IVR) phone calls, etc. Ideally, as many responsible individuals as possible should receive the alarm to alert at least one of them of the urgent need to take remedial action in view of the impending failure to present the scheduled presentation at the scheduled show time.

The process 300 of FIG. 3 provides an escalation at step 326 in the KDM retrieval process wherein the secure media block 160 of FIG. 1 attempts to directly contact the key message distributor 120 of FIG. 1. Step 326 provides a mechanism to address the urgent situation resulting from the inability to obtain the needed KDM through the previous steps in the retrieval process. Preferably, although not essential to the KDM management technique of the present principles, the theater management system 150 of FIG. 1 should make frequent regular connections so that plenty of lead time and opportunities exist for later retries. Such regular connections made by the theater management system 150 should minimize the circumstances where each the secure media block 160 must initiate an external connection to the key message distributor 120 of FIG. 1. The retrieval processes 200 and 300 of FIGS. 2 and 3 achieve this goal.

In the worst-case scenario, when network communication within the theater 140 of become unavailable, which would prevent a screen management system associated with the secure media block 160 from contacting either the theater management system 150 or the key message distributor 120, the secure media block 160 should have the ability to accept a KDM provided by on a removable media provided via interface 210 of FIG. 1. The retrieval process 300 of FIG. 3 provides for this contingency beginning with initiation of a manual start at step 310.

The operator of the secure media block 160 could be explicitly initiate the manual start by pressing a button or performing a similar type of manual activity. The manual start initiated during step 310 could occur implicitly in response to the detection by the secure media block 160 of the new insertion of a removable media at the interface 210. Step 312 follows the manual start step 310, whereupon the secure media block 160 of FIG. 1 attempts to access to the removable media 190. Upon a successful access and finding at least one pertinent KDM, the process 300 of FIG. 3 continues at step 314. Otherwise, the process continues at step 318, discussed above.

Every pertinent KDM found on a removable media 190 undergoes downloading at the interface 214 during step 314 and consolidation during step 316 via consolidation process 250 of FIG. 2. The process continues thereafter at step 318.

Figure 4:
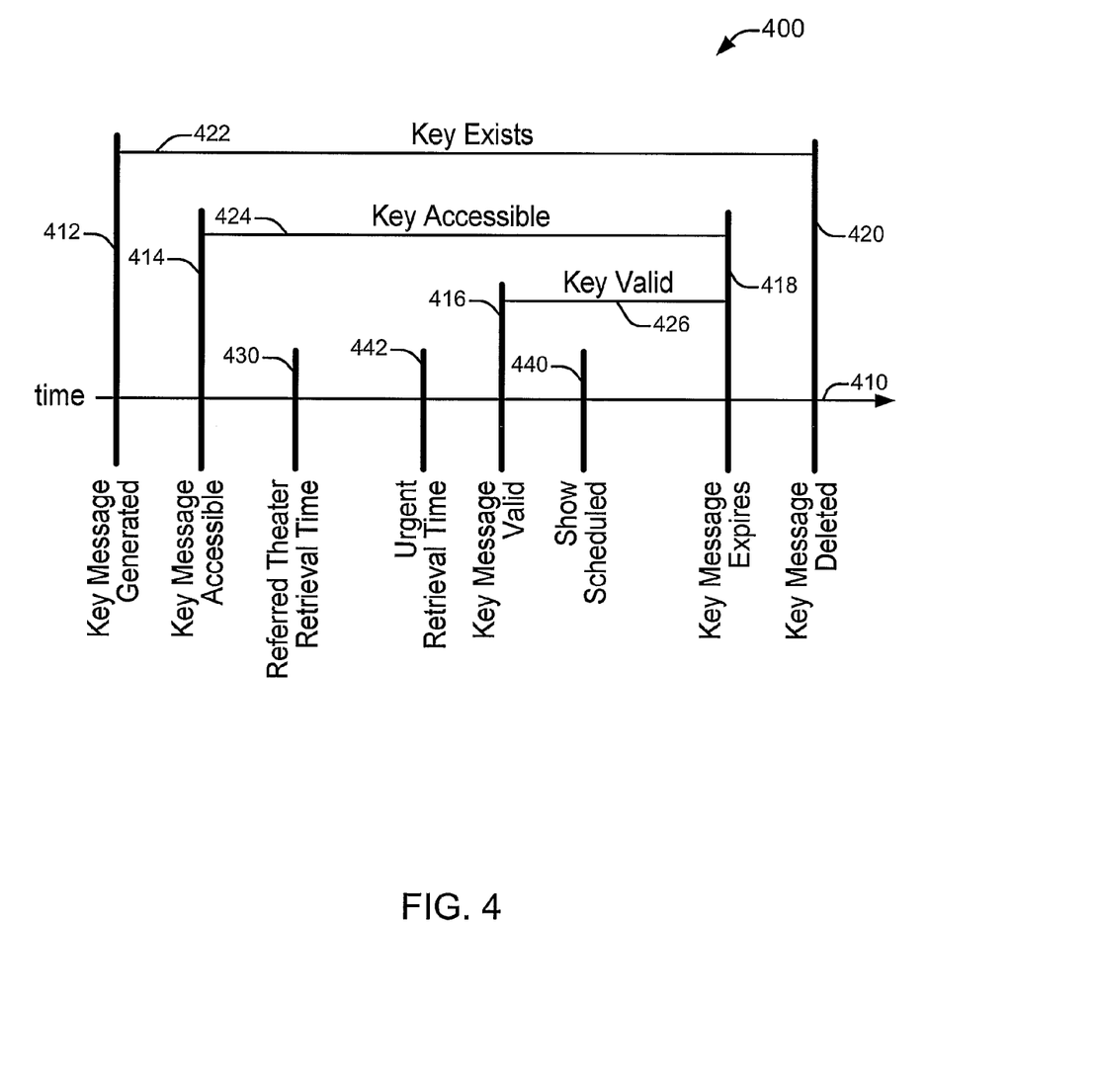

FIG. 4 shows a timeline 410 illustrating significant points in the lifecycle 400 of a KDM in accordance with the present principles. Event 412 corresponds to the creation of a KDM created by the key message generator 110 of FIG. 1. The KDM (and the key it includes) will exist during the interval 422 which ends at event 420 corresponding to deletion of the KDM. Under some circumstances, the rights owner of the content protected by the KDM (typically, the studio) does not want the KDM distributed immediately upon creation (event 412). Rather, the rights owner will require a delay in making the KDM accessible until a certain later time corresponding to event 414. Typically, the key embodied in the KDM remains accessible during an interval 424 which ends at event 418 corresponding to expiration of the key within the KDM. Note that that interval 422 during which the key within the KDM exists can exceed the interval 424 during which the key in the KDM remains accessible. While the KDM exists until deletion (event 428), expiration of the key in the KDM (event 418) effectively prevents key access after that time.

Within the time interval 422 during which the KDM and its embodied key exist, other events typically occur. For example, the preferred theater retrieval time (event 430) will occur. Likewise, an urgent retrieval time (event 442) will also occur during interval 422 some time after event 430.

The key embodied with a KDM becomes valid at a prescribed time (event 415) and remains valid during the interval 426 which expires with event 418. Note that the time at which the key within the KDM becomes valid (event 415) to allow decrypting of encrypted content occurs some time after creation of the KDM (event 412) and when the KDM becomes accessible. In the illustrated embodiment, event 415 also occurs after event 442.

In illustrated embodiment of FIG. 4, maintaining two parallel file hierarchies serves to maintain a difference between the accessibility of the key within the KDM during interval 424 and the existence of the key in the KDM during interval 422. The first hierarchy, which is designated for new, but unreleased keys, is used when keys are first delivered from the key message generator 110. This first hierarchy remains inaccessible to the theater 140. When the rights owner permits access to the key in the KDM after event 414, any affected KDM undergoes a move from the first hierarchy to the second, accessible hierarchy. Preferably, accessibility of a KDM occurs sufficiently in advance of the preferred theater retrieval time (event 430), at which time the theater management system 150 is scheduled to initiate key retrieval process 200 at step 220 of FIG. 2. Any earlier execution of processes 200 and 300 will fail to retrieve a KDM which has not entered its accessibility interval 424.

As provided in the DCI Specification, each KDM has embedded within it a pair of dates, corresponding to events 416 and 418, respectively, in FIG. 4 between which the KDM permissibly can decrypt a presentation. The validity interval 426 runs between these two dates. A scheduled show time (event 440) must lie within validity interval 426 in order for the presentation to succeed. The Urgent retrieval time (event 442) must occur sufficiently in advance of the scheduled show time (event 440) if the necessary KDM has not yet been obtained. The urgent retrieval time (event 442) will trigger the execution of key retrieval process 300 at step 350 of FIG. 3 if the necessary KDM has not already been obtained.

If the key retrieval process 200 of FIG. 2 fails to obtain a needed KDM at the preferred retrieval time (event 430), the theater management system 150 can make a secondary attempt by scheduling a re-attempt time (not shown) prior to urgent retrieval time (event 442). This approach constitutes a preferable course of action when, for example, the WAN interface 172, or the key message distributor 120 become unavailable at the preferred retrieval time (event 430).

Preferably, the urgent retrieval time (event 442) should occur sufficiently in advance of scheduled show time (event 440) so that theater personnel have enough time to respond to the alerts generated during step 334 of FIG. 3 and obtain the required KDM by extraordinary means, such as those previously described regarding the remote terminal 180 of FIG. 1 or by other means. In this regard, the key message distributor 120 of FIG. 1 should possess the ability to detect the failure to retrieve a KDM once it becomes valid at event 416. Such detection could occur by making a log on the storage device 122 of FIG. 1 upon each KDM distribution. Upon the occurrence of event 416, if there no record exists of distributing the corresponding KDM, then, the storage device 122 can appropriately record the KDM retrieval failure, suggesting that the corresponding theater 140 has not appropriately scheduled a presentation for a generated KDM, and could be in danger of missing a presentation show time. Such an alert preferably goes to the same personnel that were alerted during step 334 of FIG. 3.

Those skilled in the art will understand the many possible alternatives embodiments suggested herein without departing from the teaching of the present principles. In particular, variations of the specific protocols described in the above example could be employed. Protocols could be selected which require more or less security (e.g., VPN, SSL, dynamic credentials, etc.), or that use different underlying representations. For instance, the key message distributor 120 could implement a database service responding to a parameterized query rather than implementing a remote file service (such as FTP, NFS, etc.). Rather than storing a KDM as a discrete file in a file system or database, the key message generator 110 could generate a KDM on demand by working in concert with the key message distributor 120. A single transfer of an entire set of KDMs apropos to the theater 140 could occur by various means (e.g., a zip file, or a recursive copy of the subdirectory associated with the theater 140).

The invention claimed is:

1. A method for key management at a digital cinema presentation facility that exhibits digital cinema presentations at scheduled show times, comprising:
    (a) evaluating whether at least one key distribution message having a key for decrypting a digital cinema presentation, is present at a digital cinema presentation system to decrypt the digital cinema presentation, and if so
    (b) testing whether the key distribution message determined to be available to decrypt the digital cinema presentation has a validity interval encompassing a scheduled show time for the digital cinema presentation; and if so
    (c) initiating exhibition of the digital cinema presentation at the scheduled show time show time using the key to decrypt the presentation, otherwise
    (d) obtaining an alternate key distribution message,
    (e) checking for expiration of the alternate key distribution message; and
    (f) retaining the alternate key distribution message when not expired.

2. The method according to claim 1 wherein the alternate key distribution message is checked for expiration by determining if it has a validity interval that encompasses a scheduled show time for the digital cinema presentation; and if the alternative key distribution message is not expired, then exhibiting digital cinema presentation at the scheduled show time show time using the alternative key distribution message to decrypt the presentation.

3. The method according to claim 2 further comprising the step of consolidating the alternate key distribution message with the key distribution message that is present.

4. The method according to claim 3 wherein the consolidating step further comprises the steps of:
    checking the alternate key distribution message for duplication with the key distribution message determined to be present; and
    retaining the alternate key distribution message when not duplicative.

5. The method according to claim 4 further comprising the step of discarding the alternate key distribution message if duplicated or expired.

6. The method according to claim 1 wherein the alternate key distribution message is obtained by accessing a store of key distribution messages.

7. The method according to claim 6 wherein the access of the store of key distribution messages occurs in advance of the scheduled show time for the digital cinema presentation.

8. A key management method for use by a digital cinema presentation system, comprising the steps of:
    checking prior to the scheduled show time for the digital cinema presentation whether the digital cinema presentation system possesses a key distribution message for decrypting the digital cinema presentation, and if so:
    testing whether the key distribution message possessed by the digital cinema presentation system has a validity interval encompassing the scheduled show time for the digital cinema presentation; otherwise,
    obtaining an alternate key distribution message for decrypting the digital cinema presentation from an available source;
    checking for expiration of the alternate key distribution message; and
    retaining the alternate key distribution message when not expired.

9. The method according to claim 8 wherein the step of checking whether the digital cinema presentation system possesses a key distribution message for decrypting the digital cinema presentation occurs repeatedly.

10. The method according to claim 8 wherein the step of obtaining the alternate key distribution message further comprises the step of accessing a store of key distribution messages to retrieve at least one key distribution message for decrypting the digital cinema presentation.

11. The method according to claim 8 wherein the step of obtaining the alternate key distribution message further comprises the step of retrieving the key distribution message from a manually provided removable media.

12. The method according to claim 11 wherein the step of obtaining the alternate key distribution message further comprises the step of manually saving the key distribution message to the removable media with a remote terminal able to obtain the key distribution message from a key message distributor.

13. The method according to claim 8 further comprising the step of generating an alarm in the event the key distribution message has not been obtained following an urgent retrieval time in advance of the scheduled show time.

14. A key management system, comprising:
a key distribution storage unit; and
a secure media block configured to (1) evaluate whether at least one key distribution message for decrypting a digital cinema presentation is present at a digital cinema presentation system to decrypt the digital cinema presentation, (2) test whether the at least one key distribution determined to be present has a validity interval encompassing a show time for the digital cinema presentation; (3) initiate exhibition digital cinema presentation at the scheduled show time show time using the key distribution message to decrypt the presentation, but if the key distribution message is not present or if the key distribution message does not have not a validity interval encompassing the show time for the digital cinema presentation, (4) obtain from the key distribution store an alternate key distribution message for evaluation and testing, (5) check for expiration of the alternate key distribution message; and (6) retain the alternate key distribution message when not expired.

15. The system method according to claim 14 wherein the key distribution storage unit comprises a removable storage media.

16. The system according to claim 14 wherein the secure media block generates an alarm in the event the alternate key distribution message has not been obtained.

17. The system according to claim 14 wherein the secure media block checks whether the alternate key distribution message is expired by determining whether the alternate key distribution message has a validity interval encompassing the scheduled show time for the digital cinema presentation in order to initiate exhibiting the digital cinema presentation at the scheduled show time show time using the alternative key distribution message to decrypt the presentation.

18. A key management system, comprising: means for storing key distribution messages; and security means for (1) evaluating whether at least one key distribution message for decrypting a digital cinema presentation is present at a digital cinema presentation system to decrypt the digital cinema presentation, (2) testing whether the at least one key distribution determined to be present has a validity interval encompassing a show time for the digital cinema presentation; (3) initiating exhibition digital cinema presentation at the scheduled show time show time using the key distribution message to decrypt the presentation, but if the key distribution message is not present or if the key distribution message does not have not a validity interval encompassing the show time for the digital cinema presentation, (4) obtaining from the key distribution store an alternate key distribution message, (5) checking for expiration of the alternate key distribution message; and (6) retaining the alternate key distribution message when not expired.

19. The key management system of aim 18 wherein the security means comprises a secure media block.

20. The key management system according to claim 18 wherein the security means checks whether the alternate key distribution message is expired by determining whether the alternate key distribution message has a validity interval encompassing the scheduled show time for the digital cinema presentation in order to initiate exhibiting the digital cinema presentation at the scheduled show time show time using the alternative key distribution message to decrypt the presentation.

\* \* \* \* \*